US010187340B2

(12) United States Patent
Pulfer et al.

(10) Patent No.: US 10,187,340 B2
(45) Date of Patent: Jan. 22, 2019

(54) REDUCING INADVERTENT DATA LOSS IN EMAIL (71) Applicant: Titus, Inc., Ottawa (CA)

(72) Inventors: Charlie Pulfer, Ottawa (CA); Kevin Carlyle, Ottawa (CA); Jimmy Bigelow, Ottawa (CA); Paul Reid, Brockville (CA)

(73) Assignee: Titus, Inc., Ottawa (CA)

( * ) Notice: Subject to any disclaimer, the term of this patent is extended or adjusted under 35 U.S.C. 154(b) by 0 days.

(21) Appl. No.: 15/120,180

(22) PCT Filed: Feb. 23, 2015

(86) PCT No.: PCT/CA2015/050135
§ 371 (c)(1),
(2) Date: Aug. 19, 2016

(87) PCT Pub. No.: WO2015/123782
PCT Pub. Date: Aug. 27, 2015

(65) Prior Publication Data
US 2017/0063755 A1 Mar. 2, 2017

Related U.S. Application Data (60) Provisional application No. 61/942,936, filed on Feb. 21, 2014.

(51) Int. Cl.
*G06F 7/00* (2006.01)
*H04L 12/58* (2006.01)
(Continued)

(52) U.S. Cl.
CPC .............. *H04L 51/12* (2013.01); *G06F 3/14* (2013.01); *G06F 17/211* (2013.01);
(Continued)

(58) Field of Classification Search
CPC ................... G06F 17/21; G06F 3/0482; G06F 2221/2113; H04L 51/12; H04L 51/24
See application file for complete search history.

(56) References Cited

U.S. PATENT DOCUMENTS

2005/0039130 A1* 2/2005 Paul .................. G06F 17/30017
715/730
2006/0206713 A1 9/2006 Hickman et al.
(Continued)

OTHER PUBLICATIONS

International Search Report and Written Opinion for Application No. PCT/CA2015/050135 dated May 13, 2015.

*Primary Examiner* — Stephen S Hong
*Assistant Examiner* — Marshon Robinson
(74) *Attorney, Agent, or Firm* — Carlson, Gaskey & Olds, P.C.

(57) ABSTRACT

A method, mobile device and system are provided for managing and displaying email messages on a device having security classification metadata. The security classification metadata is extracted on the mobile device from the email messages. A presentation characteristic for the email message is determined based on a comparison of the extracted security classification metadata of the email message to a security classification policy. The email messages on the device can then be presented in accordance with the determined presentation characteristic of each respective email associated with the security classification metadata. In addition, in replying to an email in one or more subsets of recipients of the email message can be determined where each of the recipients of a respective subset having at least one security classification in common. A visual indication of at least one of the determined one or more subsets of recipients can be presented wherein the user can select the reply group to ensure that only the appropriate recipients receive the email message.

23 Claims, 9 Drawing Sheets

(51) Int. Cl.
*G06F 3/14* (2006.01)
*G06Q 10/10* (2012.01)
*G06F 21/60* (2013.01)
*G06F 17/21* (2006.01)
*H04L 29/06* (2006.01)
*G09G 5/00* (2006.01)
*G06F 3/0482* (2013.01)

(52) U.S. Cl.
CPC ........... *G06F 21/606* (2013.01); *G06Q 10/10* (2013.01); *G09G 5/00* (2013.01); *H04L 51/00* (2013.01); *H04L 51/24* (2013.01); *H04L 63/104* (2013.01); *H04L 63/20* (2013.01); *G06F 3/0482* (2013.01); *G06F 2221/2113* (2013.01); *G09G 2358/00* (2013.01)

(56) References Cited

U.S. PATENT DOCUMENTS

| | | | |
|---|---|---|---|
| 2008/0091785 A1 | 4/2008 | Pulfer et al. | |
| 2010/0161460 A1* | 6/2010 | Vroom | G06Q 40/123 |
| | | | 705/31 |
| 2011/0131279 A1* | 6/2011 | Karnik | G06Q 10/107 |
| | | | 709/206 |
| 2011/0219081 A1* | 9/2011 | Parthasarathy | H04L 51/12 |
| | | | 709/206 |
| 2012/0246725 A1 | 9/2012 | Osipkov | |
| 2015/0052451 A1* | 2/2015 | Cueto | H04M 1/72552 |
| | | | 715/752 |

* cited by examiner

REDUCING INADVERTENT DATA LOSS IN EMAIL

CROSS-REFERENCE TO RELATED APPLICATION

U.S. Provisional Patent Application No. 61/942,936 filed Feb. 21, 20014 the entirety of which is incorporated by reference for all purposes.

TECHNICAL FIELD

The present disclosure relates to the use of email and in particular creation and consumption of secure email.

BACKGROUND

Email is a common communication method. Corporations, organizations and individuals may send emails. The information contained in emails may be intended to be provided only to select individuals; however, as a result of the ability to easily add recipients to messages, the information intended to be secure may be leaked to unintended recipients. When a recipient is added to the email, they may not be appropriate to be added to the conversation. It can be very confusing to the user creating or replying to an email, what recipients are appropriate to add or to communicate certain content with particularly when using mail program on a smart phone or mobile device.

It would be desirable to have additional, alternative and or improved method for displaying and responding to emails.

SUMMARY

In accordance with the present disclosure there is provided a method of displaying a plurality of email messages on a device comprising for each of the plurality of email messages extracting security classification metadata from the email message; and determining a presentation characteristic for the email message based on a comparison of the extracted security classification metadata of the email message to a security classification policy; and presenting each of the plurality of email messages on the device in accordance with the determined presentation characteristic of each respective email.

In an embodiment of the method, extracting the security classification metadata from the email message comprises: determining a security classification metadata schema associated with the email message; and extracting the security classification metadata from the email message based on the security classification metadata schema.

In a further embodiment, the method may further comprise: determining if the security classification metadata schema is stored in a local cache; and requesting the security classification metadata schema from a schema provider when the security classification metadata schema is not stored in the cache.

In a further embodiment of the method, requesting the security classification metadata schema comprises sending an indication of the security classification metadata schema along with user information of a user.

In a further embodiment, the method may determine if the user is authorized to receive the requested security classification metadata schema based on the user information.

In a further embodiment of the method, determining the presentation characteristic comprises: sending a security classification policy request including metadata information extracted from the email and user information; and receiving a response to the security classification policy request.

In a further embodiment of the method, the display policy request further comprises device information.

In a further embodiment of the method, the response to the security classification policy comprises an indication of the presentation characteristic.

In a further embodiment of the method, the response to the security classification policy comprises the security classification policy.

In a further embodiment of the method, the determined presentation characteristics of each respective email specifies one or more visual characteristics of the respective email.

In a further embodiment of the method, of claim 10, wherein the specified one or more visual characteristics of the respective email includes a graphical banner indicative of a classification of the respective email.

In a further embodiment of the method, the visual characteristic comprises redacting information in the email.

In a further embodiment of the method, presenting each of the plurality of email messages is done on a mobile device and provides an indication of metadata classification information associated with the respective email messages.

In a further embodiment of the method, the presentation characteristic is determined based upon a location of the device.

In a further embodiment of the method, the presentation characteristic is determined based upon a network that the device is connected to.

In a further embodiment of the method, wherein the presentation characteristic is determined based upon a network connection type of the device.

In a further embodiment of the method, presenting each of the plurality of email messages in accordance with the determined presentation characteristic of each respective email further comprises one or more of: presenting the email with graphical information indicative of the extracted metadata, presenting the email with tactile feedback indicative of the extracted metadata, and presenting the email with auditory feedback indicative of the extracted metadata.

In a further embodiment of the method, wherein the presentation characteristic is determined based upon a determined security of the associated network.

In accordance with the present disclosure there is further provided a method of replying to an email message comprising: determining one or more subsets of recipients of the email message, each of the recipients of a respective subset having at least one security classification in common; displaying a visual indication of at least one of the determined one or more subsets of recipients; receiving a user selection of a subset of recipients selected from the determined the one or more subsets of recipients; and including the selected subset of recipients as recipients of the response email.

In accordance with an embodiment of the method of replying to an email message, determining the classification of the email comprises: determining if the email is classified; and receiving a classification of the email from a user when the email is determined to be not classified.

In accordance with the present disclosure there is further provided a method of creating an email comprising: specifying a classification of the email; retrieving contact information of a plurality of contacts; comparing a classification of each of the plurality of contacts to the classification of the email; and displaying the plurality of contacts based on the comparison between the contact's classification and the email's classification.

In an embodiment of the method of creating an email, displaying the plurality of contacts comprises providing a visual indication of the determined safeness of each of the contacts.

In accordance with the present disclosure there is further provided a mobile device comprising: a processing unit for executing instructions; and a memory unit for storing instructions, which when executed by the processing unit configure the mobile device to perform the methods described above.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Email may be sent between a number of different recipients. The information contained within the email may be classified and its dissemination controlled. As an example, an organization may deal with highly secret information that should not be shared with individuals outside of the organization. However, when viewing emails it may be difficult for the user to easily determine the classification of the email particularly when using a smart phone or mobile device. When replying to non-classified emails, a user may inadvertently include classified information in the response without realising that the original email was not classified, and included contacts outside of the organization. As such, a user may inadvertently provide classified information to unintended recipients. If users do not pay attention to the classification of emails as well the recipients of emails information may be leaked.

Figure 1:
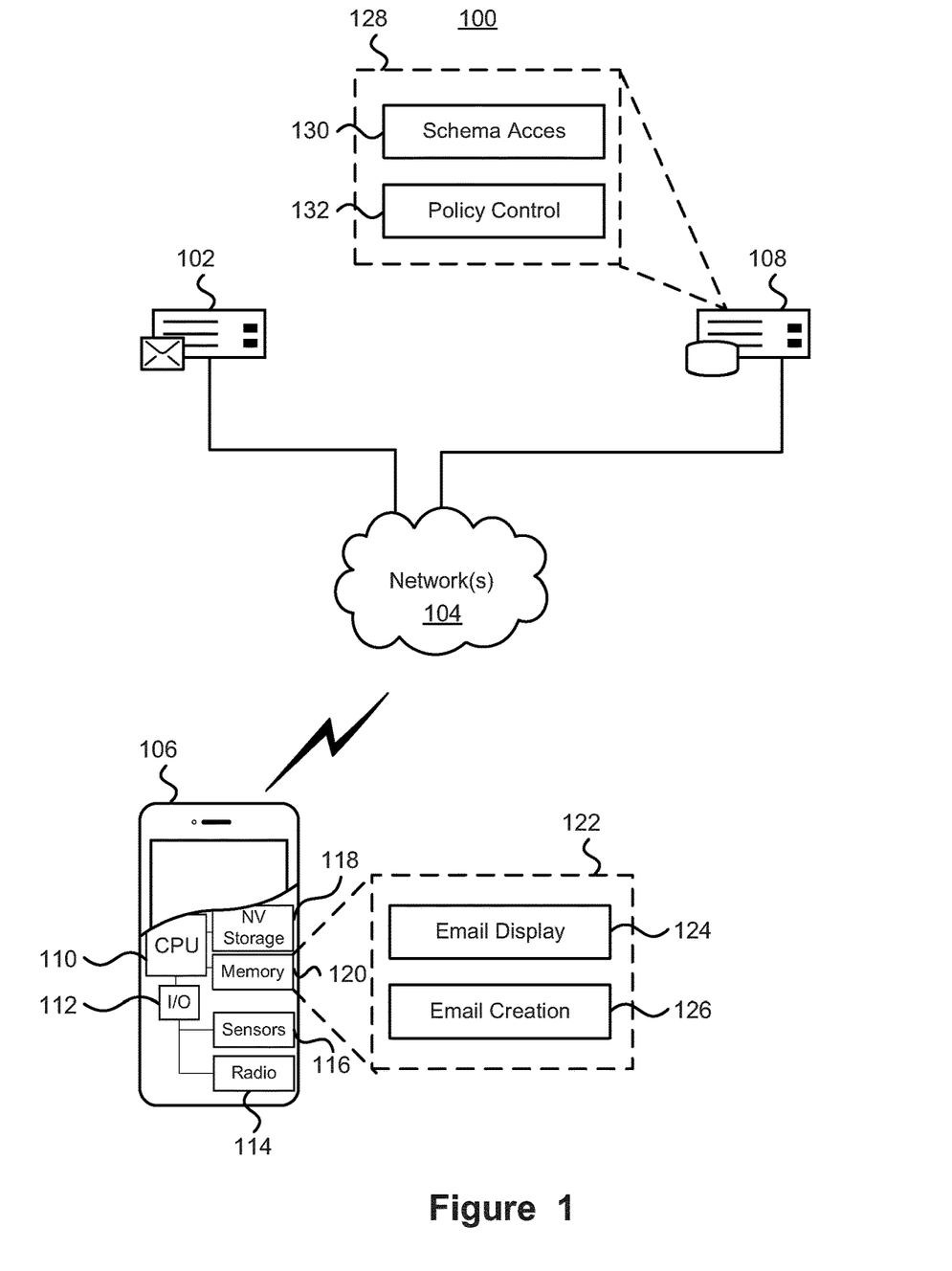
FIG. 1 depicts components of an email display and creation system.

FIG. 1 depicts components of an email display and creation system. The system 100 comprises an email server 102 for sending and receiving emails. It will be appreciated that a number of different email servers may be present for sending and receiving email to different recipients. The email server 102 is connected to one or more networks 104 for communicating with one or more email clients. Although only a single network is depicted in FIG. 1, the particular implementation and topology of the network may vary and include a number of interconnected public and private networks. While any number of email clients may be used, a mobile device such as a smart phone device 106 is depicted for sending and receiving emails to and from the email server 102. In addition to the email server 102, the smart phone 106 may also communicate with a classification server 108 that provides various functionality for use by the smart phone 106, or other email clients, when displaying and responding to emails as described further herein.

The smart phone 106 comprises a processing unit 110 for executing instructions. One or more input/output (I/O) interfaces 112 may be provided for connecting additional devices or components to the processing unit 110. For example, the additional devices may comprise one or wireless communication radios 114, such as but not limited to wide area network (WAN) technologies such as but not limited to 3G, 4G, and 5G, local area network (LAN) technologies such as but not limited to Wi-Fi™, or personal area network (PAN) technologies such as Bluetooth™, and one or more sensors 116, such as global positioning system (GPS). The smart phone 106 may further comprise non-volatile storage 118 for the long-term storage of data and instructions. The smart phone 106 may also comprise memory 120 for storing instructions, which when executed by the processing unit 110 configure the smart phone 106 to provide various functionality 122 for use in creating and consuming emails. As depicted in FIG. 1 and described in further detail below, the functionality 122 includes functionality for use in displaying emails 124 as well as for use in creating emails 126. As described further herein, the email display functionality 124 may control the display of emails based on security classification metadata of the individual emails as well as policy information that specifies one or more rules regarding the display of emails. As an example, the security classification metadata of an email may specify that the email is classified by the sender as 'top secret' and the security classification policy may specify that top secret emails be displayed in a particular color to aid the user in identifying which emails are top secret and which are not. The email creation functionality 126 aids a user in creating new emails, or replying to existing emails by providing an indication of suitable contacts for receiving the email. For example, when replying to an email with information classified as 'top secret', the email creation functionality 126 may display contacts that are associated with 'top secret' or higher security clearance in a particular color. Although described as being displayed in a particular color, it will be appreciated that other visual cues or indications may be used in the display and creation of emails. Further still, in addition to or as an alternative to the visual cues, auditory or haptic feedback cues may be used. The haptic cues can include vibrations, changes to the surface of the device including increases/decreases in depth and texturing of the displayed interface.

As described, the display and creation of emails may use security classification metadata information in determining how emails, and other information such as contacts, should be displayed. The display and creation of emails may further be based on security classification policies that may specify how elements, such as emails or contacts, having a particular security classification or security clearance should be displayed. The security classification metadata enable users to classify, mark, and protect sensitive information. For example security classification metadata may include classifications of, for example: "Top Secret", "Secret", "Confidential", "Restricted", "Official", "Unclassified", "Clear", "Compartmented information", "Public". The security classification metadata may be specified in metadata schemas defined standards such as, but not limited to, the DoD Manual 5200.01-V, CUI controlled unclassified information, Australian protective marking, or NATO classification marking, Different organizations, or portions of an organization, may use different security classification metadata schemas to describe the same or similar items. For example, one organization may refer to the highest security level as "top secret" while another may refer to the same security level as "TopSec". In order to provide a consistent user experience with multiple different security classification metadata schemas used in various email systems, the smart phone may request particular metadata schemas from a classification server 108. Although not depicted in FIG. 1, the classification server 108 comprises a processing unit for executing instructions and a memory for storing the instructions which when executed by the processing unit configure the classification server 108 to provide various functionality 128, including schema access functionality 130 and policy control functionality 132. The schema access functionality 130 allows the smart phone 106 to request an appropriate security classification metadata schema to allow the use of the security classification metadata associated with an email. The policy control functionality 132 can make policy decisions, or provide policies to support making policy decisions, with regard to the display of emails. The policy control functionality 132 can provide an indication of the policy decision to the smart phone 106, which may use the policy decision information in displaying emails. Additionally or alternatively, the policy control functionality may provide policy information to the smart phone and the smart phone 106 may make the policy decision.

Figure 2:
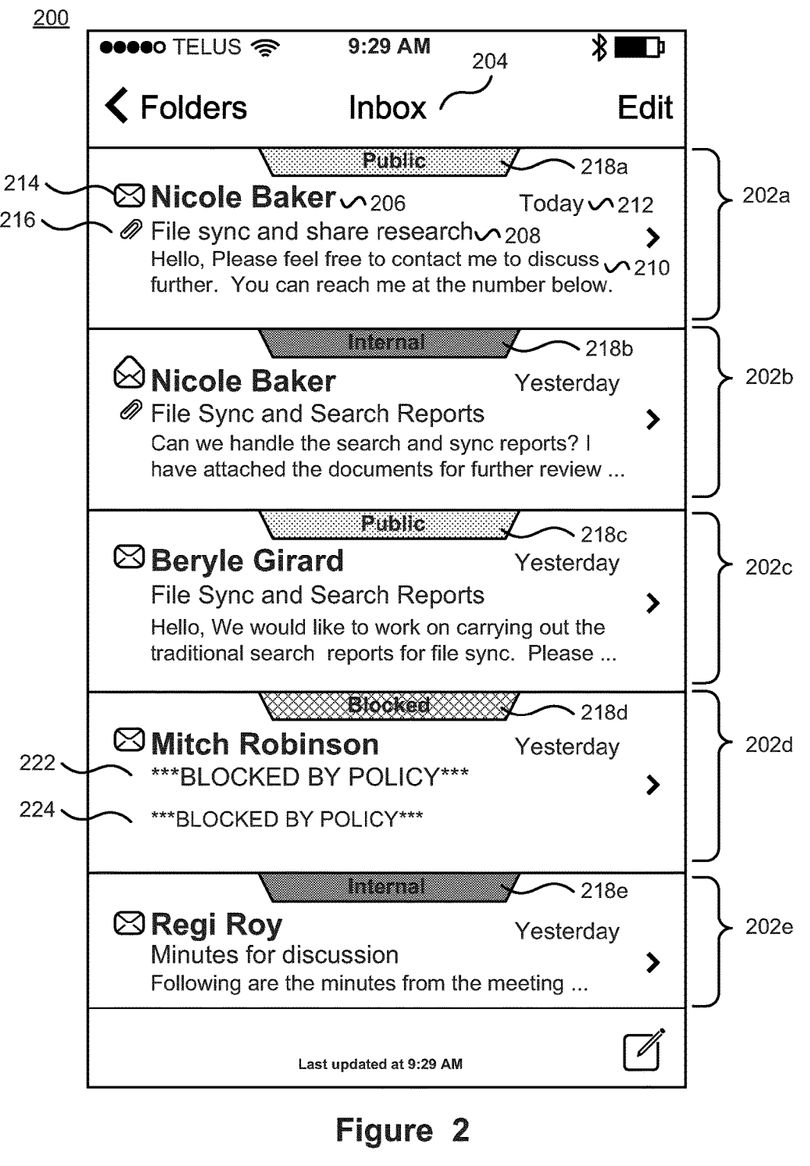
FIG. 2 depicts a user interface for displaying email along with classification information.

FIG. 2 depicts a user interface for displaying email along with classification information. The user interface 200 depicts the display of a plurality of individual email messages 202*a*, 202*b*, 202*c*, 202*d*, 202*e* (referred to collectively as emails 202) from within a folder 204, depicted as the 'Inbox' folder. As depicted with regard to email message 202*a*, each of the emails 202 may include a name of a sender 206, a subject line 208, body text 210 and a time that the email was sent or received 212. The display of the individual emails 202 may include associated icons or additional information such as an icon 214 indicative of whether or not the email message has been read as well as an icon 216 indicative of whether or not the email message is associated with an attachment.

The email display functionality may determine one or more presentation characteristics for each of the emails and display each of the emails in accordance with the determined presentation characteristics. FIG. 2 depicts that each of the emails are displayed with a classification banner 218*a*, 218*b*, 218*c*, 218*d*, 218*e* (referred to collectively as banner 218) indicating a classification of the email, such as 'Internal' or 'Public'. Although depicted as providing a visual banner 218, the display characteristics may dictate different fonts, colors, background or other visual indications indicative of the determined classification of the email, or at least based on the classification of the email. For example, in addition to or as an alternative to displaying an indication of the classification of the email, the presentation characteristic may block, obfuscate or redact information of an email. As depicted for email 202*d*, the subject line 222 and the body text is obfuscated. Additionally, the visual banner 218*d* may be used to indicate that information of the email has been blocked. The banners 218 may comprise different shapes or positions within the in box view.

As depicted in FIG. 2, the viewing of emails in a folder can be controlled in order to ensure that the information displayed is done so in accordance with security policies. As an example, the policy may indicate that top-secret emails should not be displayed at all unless the device used to display the email is accessed from a known secured network. As a further example, the policy may indicate that emails classified as 'internal' may be displayed however; the subject and body text must be obfuscated when accessed from a public network. The security policies defining how to display information of emails may be user specific, time specific, location specific, and or other device or user related information.

The presentation characteristic used in presenting emails may specify, for example visual, tactile, auditory cues and or other interactive experiences such as whether or not an email is displayed at all or displaying additional icons, graphics or animations. Visual cues can include banners, changes to type face including color changes, and or emphasis effects. Tactile cues can include vibrations, changes to the surface of the device including increases/decreases in depth and texturing of the displayed interface. Auditory cues could include sounds that are determined by policy.

Figure 3:
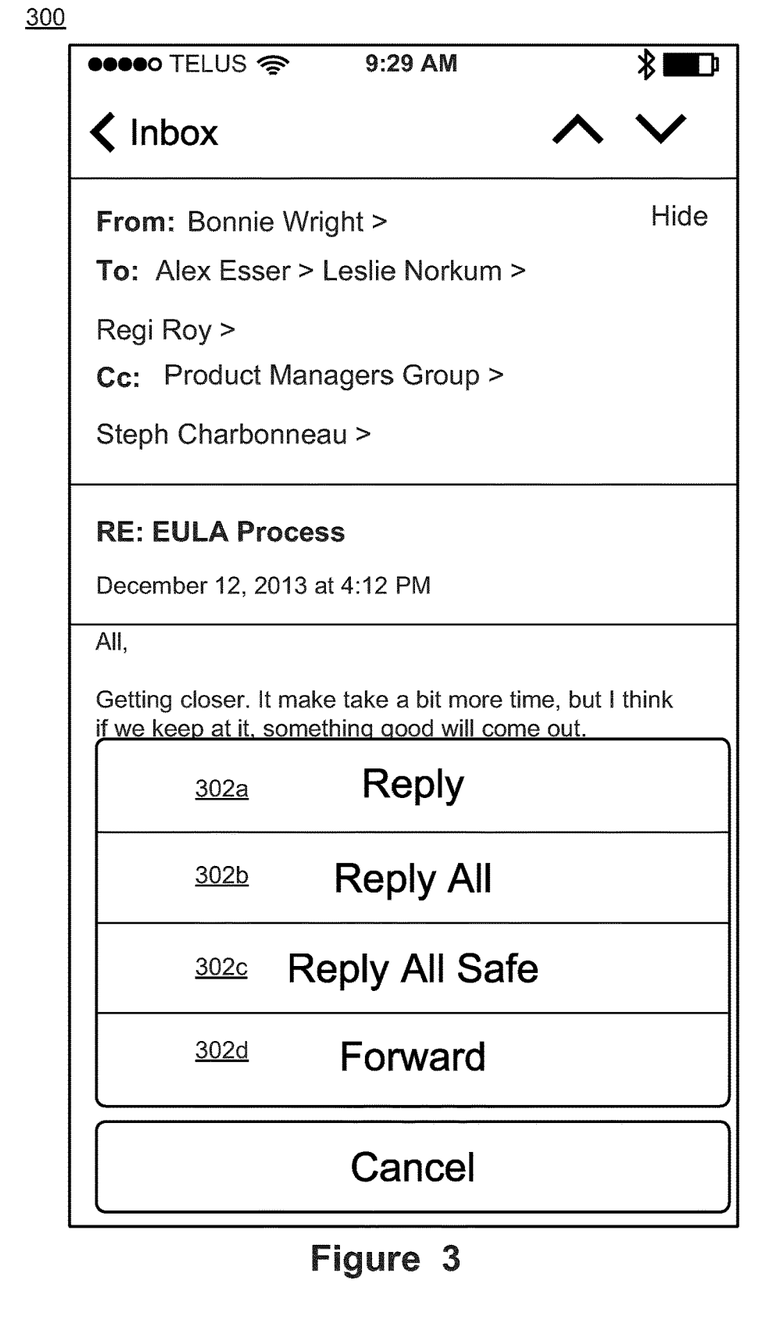
FIG. 3 depicts a further user interface for replying to secure emails.

FIG. 3 depicts a further user interface for replying to secure emails. As depicted, when replying to or forwarding an email, a user may be presented with the various options for replying to an email, including replying 302*a* to the sender, replying to all 302*b* recipients of the email, replaying to a subset of the recipients of the email such as all safe 302*c* recipients as described further, as well as forwarding the email 302*d*. Often a user wants to quickly reply to an email and will often use a 'reply all' functionality 302*b* in the email client. If the user responds to the email with information not necessarily releasable to all recipients, then having pressed reply all will include unsafe recipients, that is recipients that do not have the necessary security clearance for the added information, resulting in potentially leaking of classified information. Functionality for replying to a subset of recipients, such as all safe recipients, may be provided in order to allow a user to quickly respond to only those recipients on the list that have sufficient clearance for the email reply. When responding to an email, if the email being replied to has not been classified, the user may be forced to classify the message prior to sending. By clicking reply all safe 302*c*, the email functionality may compare the recipients to the classification of the email reply in order to ensure only those recipients with sufficient clearance, or other appropriate characteristics, are included in the recipient list. Although described with regard to replying to all safe recipients, the reply functionality may determine one or more subsets of recipients of the email message that can be included as recipients of the reply email. For example, an email may include a number of different groups of original recipients. For example, in an organization an email may be sent to all support staff, all managers and all senior managers. When responding to such an email, it may be possible to determine the different subsets of recipients, such as support staff, managers and senior managers and allow responding to all recipients of one or more of the identified subsets. In addition to being based on group membership, the subsets may be based on one or more other characteristics that the recipients have in common. For example, the subsets may be based on the organization associated with the recipients email addresses, security clearances of the recipients etc.

Figure 4:
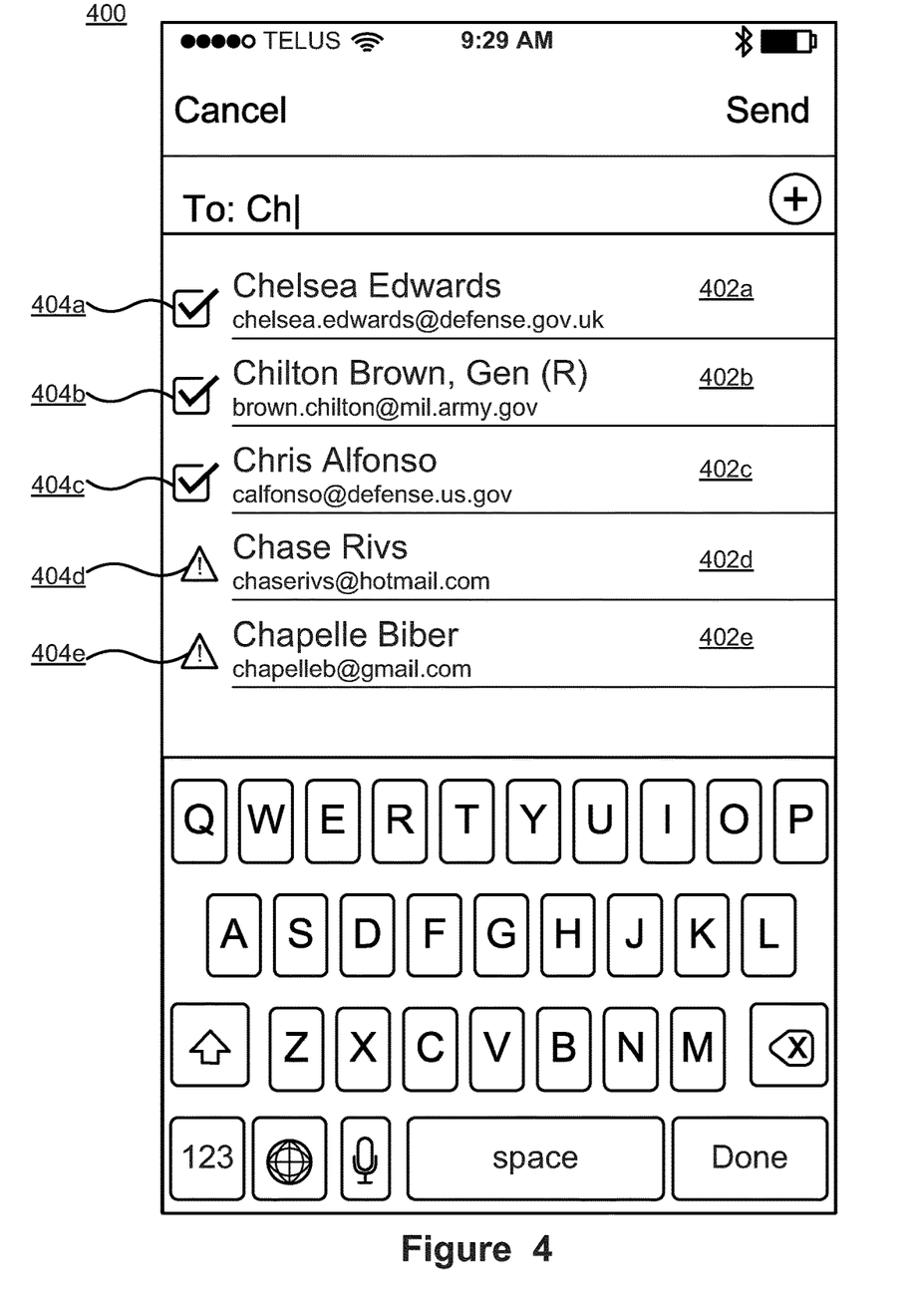
FIG. 4 depicts a further user interface for selecting contacts for a secure email.

FIG. 4 depicts a further user interface for selecting contacts for an email. The user interface 400 depicts a user interface for selecting one or more contacts to add as recipients for an email. In FIG. 4, it is assumed that the email to be sent has been classified and as such only certain recipients are safe to include as recipients. As depicted, a plurality of contacts 402a, 402b, 402c, 402d, 402e (referred to collectively as contacts 402) can be displayed, for example as a result of searching for a particular contact. The presentation of each of the contacts 402 may be based on whether or not they are considered to be safe recipients for the email, that is if the recipient's security clearance meets or exceeds a security classification of the email. As depicted, the presentation of each contact may be associated with a particular icon or graphic 404a, 404b, 404c, 404d, 404e indicative of whether or not the contact safe to be a recipient. Although FIG. 4 depicts displaying an icon 404a, 404b, 404c, 404d, 404e other indications may be provided for indicating a safeness of a contact. The indication may be visual, such as the font or color used, auditory or tactile. Further, the user experience associated with the presentation of the contacts may be altered, for example the user experience may be altered so that only those contacts that are safe to include as recipient for the email are displayed. For example contacts 404d and 404e may be identified as not being safe recipients for the email, that is the contacts are not suitable for addition to the recipient list of the email message, based upon the message's security classification and the contacts' security clearance or associated domain security clearance. The contacts 404d or 404e may not be selectable or may be selectable but an indication that an unsecure contact has been selected may be provided.

Figure 5:
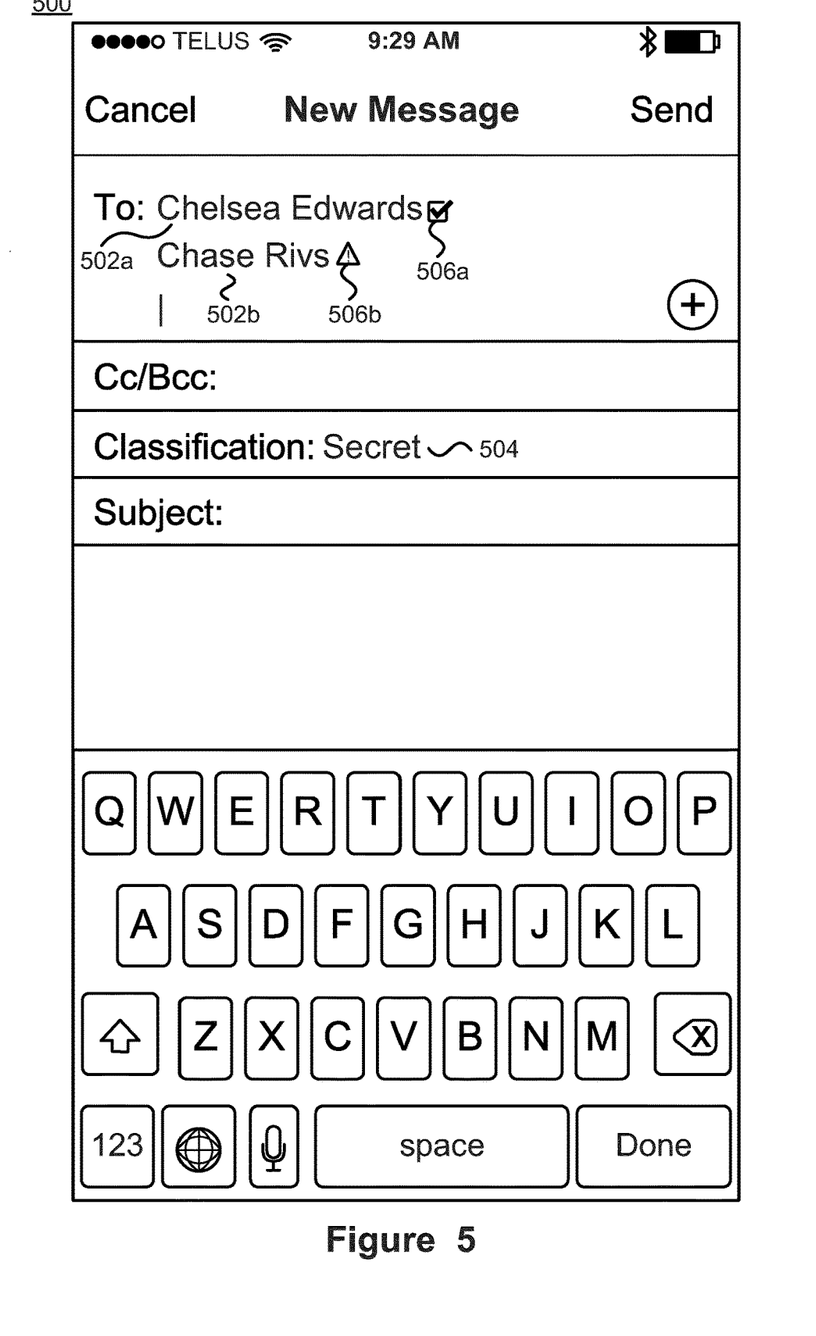
FIG. 5 depicts a further user interface for creating a new secure email.

FIG. 5 depicts a further user interface for creating a new email. The user interface 500 may be presented when a user is creating a new message and may provide an indication of recipients that are safe for the email. As will be appreciated, whether a user is considered a safe recipient of an email message may depend upon the email message being sent. For example, an email may be classified 504 as 'secret' which may dictate that certain recipient should not receive the email. If a recipient is added prior to the email being classified, or if the classification of the email is subsequently changed, the recipients included on the email may no longer be safe to receive the email. The recipient list of the email may be presented with an indication as to whether or not they are safe to receive the email. Each of the recipients 502a, 502b may include a visual indication, depicted as icons 506a, 506b, providing an indication as to the safeness of each recipient.

Figure 6:
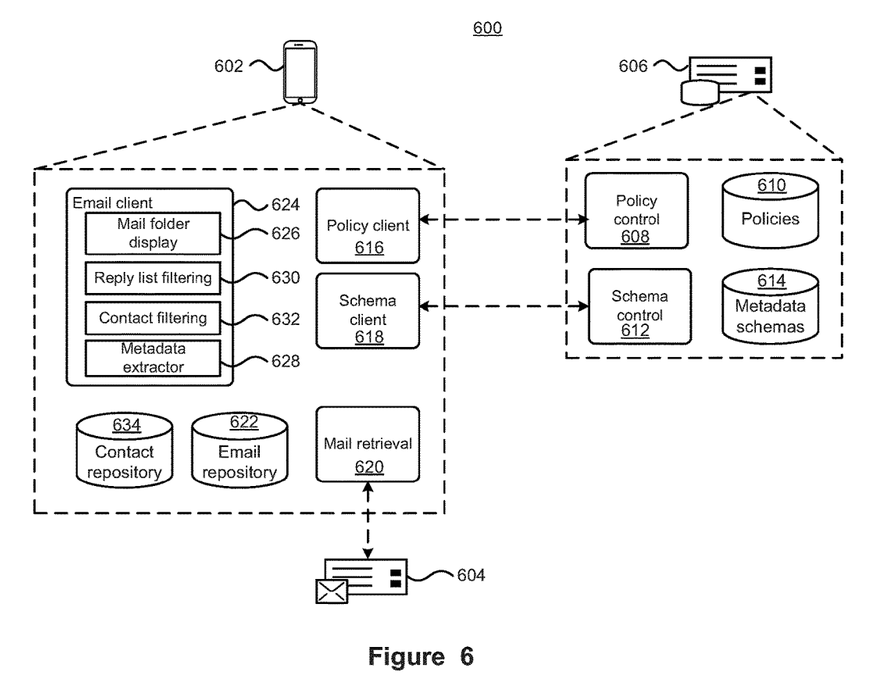
FIG. 6 depicts further components of a system for secure on mobile devices.

FIG. 6 depicts further components of a system for secure on mobile devices. As previously depicted with regard to FIG. 1, the system 600 may comprise a smart phone 602 that can retrieve and send emails though an email server 604. When displaying and creating emails, the smart phone 602 may communicate with a classification server 606 in order to process security classification metadata of emails and security clearance of contacts when determining presentation characteristics for the emails and/or contacts. As depicted, the classification server 606 may include policy control functionality 608 that can determine display characteristics for emails based on security policies. Additionally or alternatively, the policy control functionality 608 may provide security policy information to a client for use in determining the presentation characteristics. The policy control 608 may receive a policy request from a client and determine the appropriate presentation characteristics for the request, or the appropriate security policy to utilize in determining the appropriate presentation characteristics. The policy control 608 can retrieve one or more security policies for evaluation, either by the policy control functionality 608, or by similar functionality provided on the email client device, from a policy store 610 such as a database. The security policies may specify presentation characteristics to use when presenting emails or contacts. The security policies may specify the presentation characteristics to use for given email security classification metadata, different user security clearances and different device information, such as a geographic location of the device, or network the device is connected to.

The classification server 606 may further comprise schema control functionality 612 for retrieving a security classification metadata schema at the request of a client 602. The classification server 606 may be implemented as a standalone server, a distributed server or implemented as part of a cloud based service. Emails may be received from different organizations or groups that use different security classification metadata schemas for describing the information related to the email which may include security classifications that can be applied to the particular email message. In order to properly evaluate an email, it is necessary to understand the security classification metadata that is associated with the email. Accordingly, the different schemas used for emails should be accessible. The schema control functionality 612 may retrieve a particular security classification metadata schema from a metadata schema repository 614. The schema control 612 may evaluate user and/or device information submitted in a schema request in order to determine if the requestor the schema can be granted.

The smart phone 602 includes various functionality, including a policy client 616 that can make policy requests to policy control functionality 608. The policy request sent by the policy client 616 may indicate a type of the request, for example the request may be for a policy for the display of the email. The policy request may include information about the email to be displayed as well as other information including user information and device information. The policy request may request the display characteristics of the email be provided in the response, or the policy request may request the security classification policy that should be used in determining the presentation characteristics of the email. The response to the request may be cached and used for subsequent requests that are the same. The email information may be determined from the metadata of the email. The metadata information of the email may be converted into a useable format of the policy control functionality 608 using the security classification metadata schema of the email. If the schema is not available to the device, the particular metadata schema may be requested by a schema client 618. The schema client 618 can request a schema on behalf of the user. The schema may be cached by the device 602 in order to avoid requesting schemas that have already been used. The schema request may include device information such as the device type, the network type the device is connected to, the location of the device etc that is useful in determining the display policy. The schema request may also include information about the user, such as their credentials, username, nationality etc.

The policy decision may for example determine the presentation characteristics for an email based on user and device information, the metadata of the email and a security classification policy associated with the user. For example, a security classification policy that may be associated with a user or group of users may indicate that an email that is classified as top secret only be displayed on the device if the user has a security classification of top secret or higher and the device is located on a trusted network, or within a trusted geographic location. The security classification policy may provide different presentation classification based on different user information, email metadata and device information. For example, with the above example of a top secret email, a user with top secret classification may view the email if the device is on a known network, however, if it is not on a trusted network the email may be displayed with the subject line and body obfuscated or redacted.

The smart phone 602 further comprises mail retrieval functionality 620 for retrieving email messages from the email server 604. The email retrieval functionality 620 can retrieve emails from the email server 604 and store them in an email store 622. Depending upon security settings, the email retrieval functionality 620 may only temporarily store emails on the smart phone when the emails are being displayed. In order to provide additional security, secure emails may not be permanently stored on the smart phone.

An email client 624 may include email display functionality 626 for displaying emails, for example as described above with regard to the user interface of FIG. 2. The email client may further include metadata extraction functionality 628 for extracting data from the emails to be displayed. The metadata extraction functionality 628 can identify a metadata schema used for the email's metadata, and if the schema is not available on the device, the schema may be requested using the schema client functionality 618. Once the metadata of the email is extracted, the display functionality may determine how to display the email by sending a display policy request, using the policy client 616. The policy request may include metadata information extracted from the email, user information as well as device related information. The response to the policy request may specify presentation characteristics for the email, or may include information such as a security classification policy for use in determining the presentation characteristics of the email. The response may be cached for use with subsequent requests without having to send the request to the server. The determined presentation characteristics may be used by the display functionality for displaying the email message. For example, if the presentation characteristic indicates that the subject and body should be obfuscated the display functionality can generate the appropriate display.

In addition to the mail display functionality 626, the email client may also include reply list filtering functionality 630. The reply list filtering functionality 630 may present a reply option to a user for replying to a subset of recipients of the original email, such as the safe recipients only. The reply list filtering compares metadata of the email, for example a security classification of the email, to characteristics of the recipients, such as their security clearance. If the email being responded to is not already classified, the reply list filtering functionality may prompt the user to classify the email in order to properly filter the list of safe recipients. The filtering may remove recipients from the list, or may alter the visual characteristics of the recipients based on the filtering results. For example, the name of recipients that are safe for sending the email to may be displayed in green, while recipients that shouldn't receive the email are displayed in red.

In addition to the functionality described above, the email client may also include contact filtering functionality 632 for filtering contact information from a contact repository 634. The contact filtering functionality 632 may allow the display of contacts to be filtered based on characteristics of the email being sent. For example, the contacts may be filtered to provide a visual indication of those contacts that have a higher security clearance than the classification of the email. The contacts may be filtered in order to hide those contacts that do not meet the requirements. Alternatively, the filtering may be used in order to adjust the visual presentation of the contacts. Additionally or alternatively, the filtering may be used to provide auditory or tactile cues indicative of the safeness of the recipient to receive an email.

Figure 7:
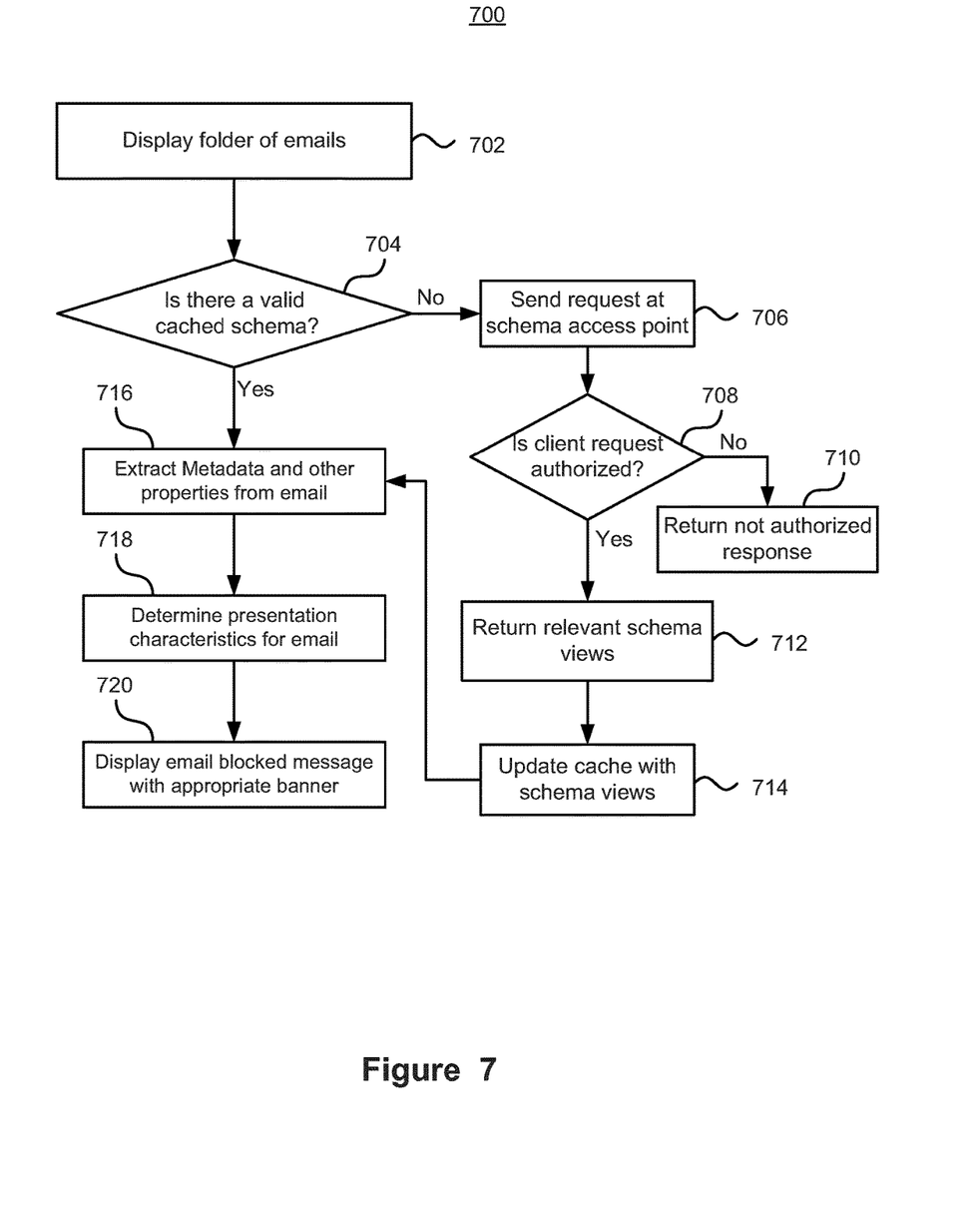
FIG. 7 depicts a method of displaying emails.

FIG. 7 depicts a method of displaying emails. The method 700 may be performed by a combination of devices, such as the smart phone and server described above. The method 700 may begin when a folder of a plurality of emails is displayed (702). For each email to be displayed, the method 700 may determine if there is a valid metadata schema (704) available that is associated with the email. The schema may be available if it has been cached already, however, if there is no valid schema available (No at 704) a request for the schema may be sent to a server (706). The request may include an indication of the desired schema as well as information about the user. Upon receiving the request the server may determine if the user requesting the schema is authorized to retrieve the schema (708), and if they are not authorized (No at 708), an appropriate response indicating that the requesting user is not authorized to receive the requested schema (710) may be returned. If however, the requesting user is authorized to receive the requested metadata schema (Yes at 708) appropriate schema is returned (712) and used to update the cache (714), if the returned schema is cacheable. Once a valid schema is available, either from being originally present in the cache (Yes at 704) or from the returned schema, it is used to extract metadata from the email to be displayed (716). The extracted metadata, along with the user information and possibly device information, is used in determining presentation characteristics for the email (718). A policy request for the email may be sent to a remote server. The policy request may be for a security classification policy that can be used in determining presentation characteristics for the email, or the request may be for the presentation characteristics. Whether done at the email client device, or at a server, the presentation characteristics may be determined based upon the user of the device in combination with parameters determined by or associated with the mobile device as well as the security classification metadata of the email. The parameter may be based upon connection or sensor information for example the identification of the network that the device is connected to, the type of connection for the network, the encryption of the connection, a determined safeness of the network, or the location or geo-fencing when connected to a network. Once the display policy is determined, it is used in order to display the email (720). The display policy may provide presentation characteristics of the email message including, for example, whether the email should be displayed, whether any information should be redacted, obfuscated, fonts and colors for the information, as well as possible icons or other graphic displays such as banners indicating a message classification.

Figure 8:
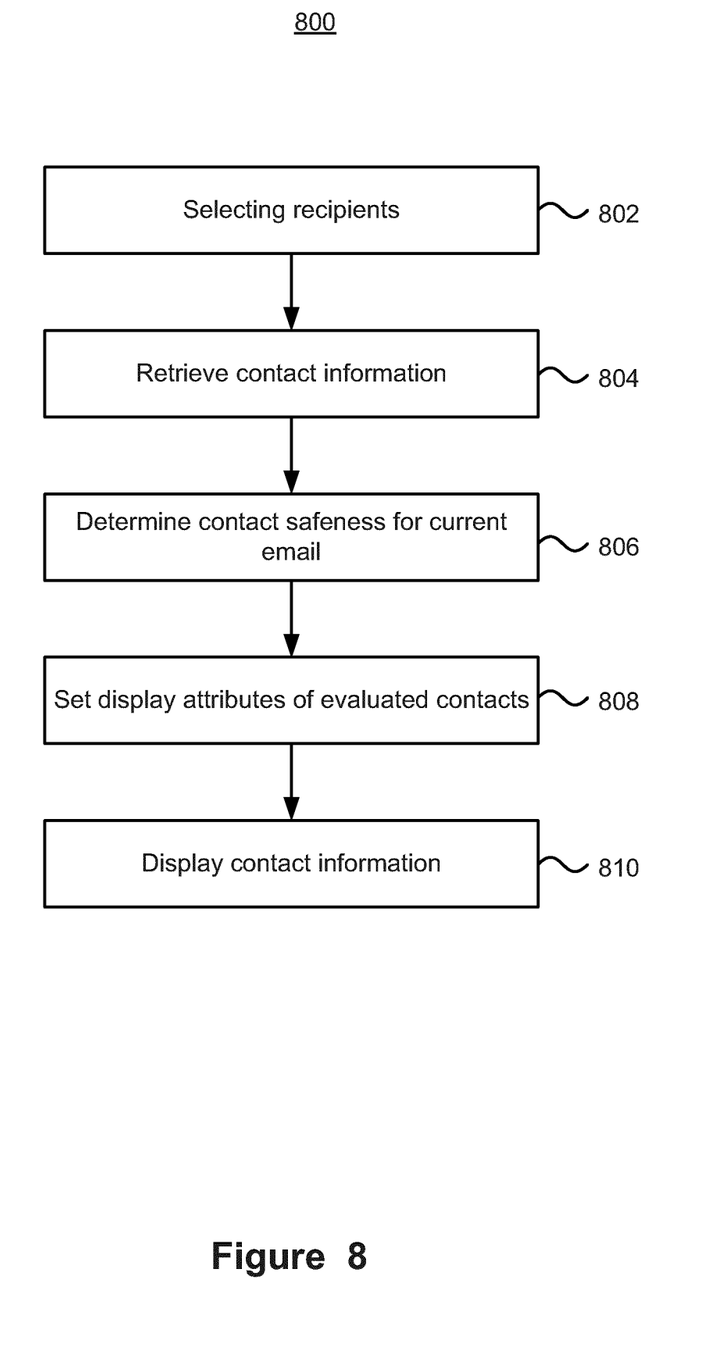
FIG. 8 depicts a method of determining the safeness of contacts.

FIG. 8 depicts a method of indicating the safeness of contacts. The method 800 begins when one or more recipients are selected (802). The recipients may be selected when a new email is created, or when replying to, or forwarding, a received email. The selection of the recipients may be done using an address book or other means for selecting recipients for an email. Contact information for one or more contacts is retrieved (804), for example by searching an address book and for each of the contacts, the safeness of the contact for the current email is determined (806). The display attributes of the evaluated contacts are set (808) based on whether or not the contact is determined to be a safe recipient of the current email and the contacts displayed accordingly (810).

Figure 9:
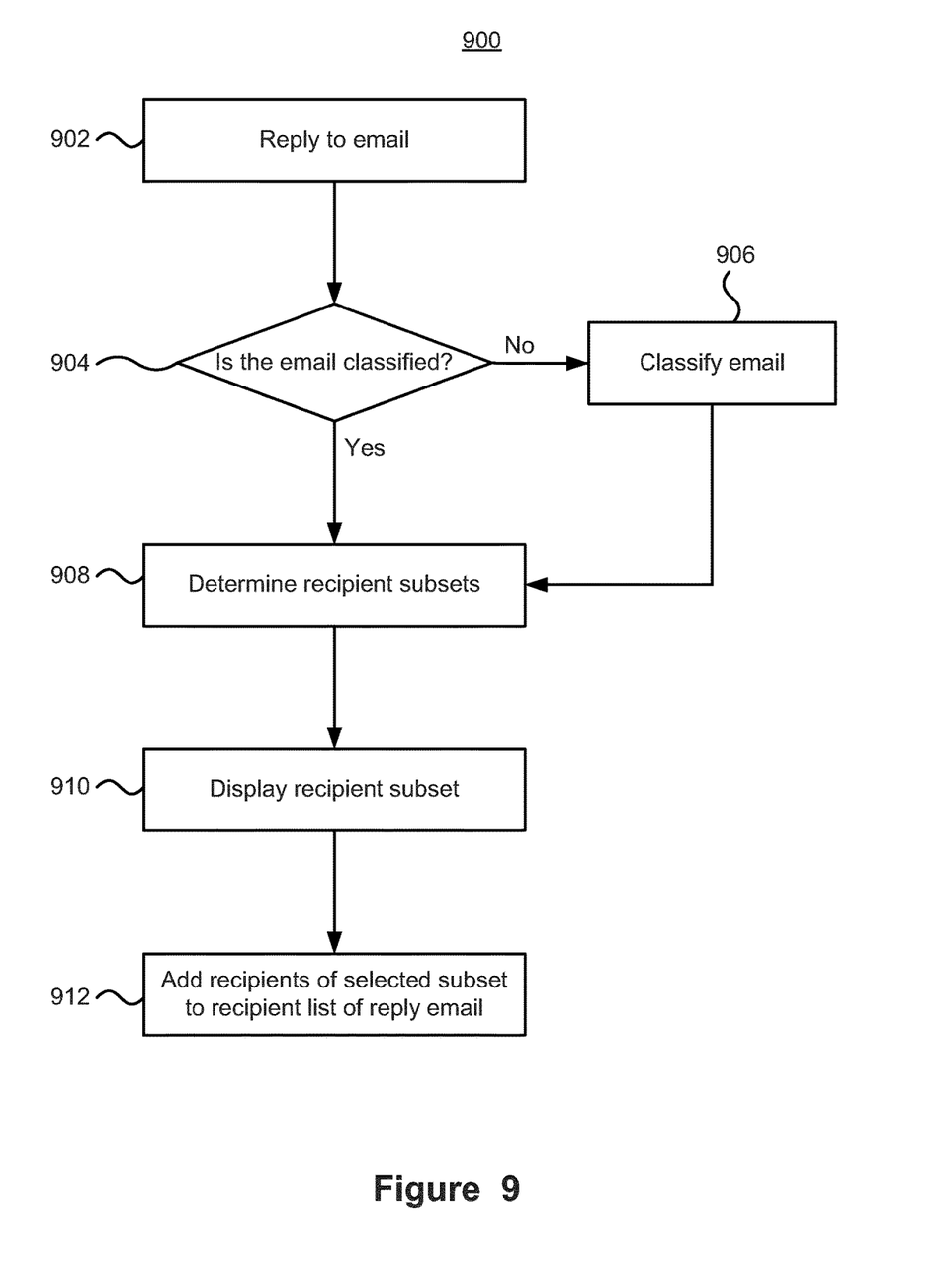
FIG. 9 depicts a method of replying to a secure email.

FIG. 9 depicts a method of replying to a secure email. The method 900 begins with responding to an email (902). It is determined if the email being responded to is classified (904), and if it is not classified (No at 904) the email is classified (906) by the user. Once the email is classified, subsets of recipients from the original email that can be responded to as a group are determined (908). For example, if there are groups of recipients, such as a plurality of managers, a subset of recipients that are managers can be determined. The subsets of recipients may be based on the classification of the email and/or security clearances or other characteristics of the recipients. For example, one subset of recipients may be 'all safe' recipients which may include all recipients having a security clearance at least equal to the classification of the reply. As a further example, a subset may include 'all internal' recipients which may include all recipients associated with an email address internal to an organization. Once the recipient subsets are determined, they are displayed (910). If a plurality of subsets were determined, one or more of the subsets may be displayed due to limited display space. Once the user selects one of the subsets for replying to, the recipients associated with the selected subset are added to the recipient list of the reply email (912).

Although above email display and creation functionality has been described with particular reference to smart phones, the implementation is also relevant to any device or software that is capable of email. For example where the email client is running on an embedded device or Internet of Things enabled device, the same issues still exist, and the methodologies for the user interface are still applicable. The same is true for thicker computing environments and richer email clients operating on general purpose computing hardware, software and operating system.

Although the description discloses example methods, system and apparatus including, among other components, software executed on hardware, it should be noted that such methods and apparatus are merely illustrative and should not be considered as limiting. It is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

In some embodiments, any suitable computer readable memory can be used for storing instructions for performing the processes described herein. For example, in some embodiments, computer readable media can be transitory or non-transitory. For example, non-transitory computer readable media can include media such as magnetic media (such as hard disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable memory that is not fleeting or devoid of any semblance of permanence during transmission, and/or any suitable tangible media.

What is claimed is:

1. A method of displaying a plurality of email messages on a mobile device comprising:
    for each of the plurality of email messages:
        determining a security classification metadata schema associated with the email message;
        determining if the security classification metadata schema is stored in a local cache on the mobile device;
        requesting the security classification metadata schema from a schema provider coupled to a network accessible by the mobile device when the security classification metadata schema is not stored in the local cache and wherein the metadata schema is downloaded to the local cache of the mobile device;
        extracting security classification metadata from the email message based on the security classification metadata schema;
        determining a presentation characteristic for the email message based on a comparison of the extracted security classification metadata of the email message to a security classification policy by sending a security classification policy request including metadata information extracted from the email and user information and receiving a response to the security classification policy request; and
    presenting each of the plurality of email messages on a display of the mobile device in accordance with the determined presentation characteristic by the security classification policy for each respective email wherein presenting each of the plurality of email messages in accordance with the determined presentation characteristic of each respective email further comprises one or more of:
        presenting the email with graphical information indicative of the extracted metadata;
        presenting the email with tactile feedback indicative of the extracted metadata; and
        presenting the email with auditory feedback indicative of the extracted metadata.

2. The method of claim 1, wherein requesting the security classification metadata schema comprises sending an indication of the security classification metadata schema along with user information of a user.

3. The method of claim 2, further comprising determining if the user is authorized to receive the requested security classification metadata schema based on the user information.

4. The method of claim 1, wherein the security classification policy request further comprises device information.

5. The method of claim 1, wherein the response to the security classification policy comprises an indication of the presentation characteristic.

6. The method of claim 1, wherein the response to the security classification policy comprises the security classification policy.

7. The method of claim 1, wherein the determined presentation characteristics of each respective email specifies one or more visual characteristics of the respective email.

8. The method of claim 7, wherein the specified one or more visual characteristics of the respective email includes a graphical banner indicative of a classification of the respective email.

9. The method of claim 7, wherein the visual characteristic comprises redacting information contained in the email.

10. The method of claim 1, wherein presenting each of the plurality of email messages is done on the mobile device and provides an indication of metadata classification information associated with the respective email messages.

11. The method of claim 1, wherein the presentation characteristic is determined based upon a location of the mobile device.

12. The method of claim 1, wherein the presentation characteristic is determined based upon a network that the mobile device is connected to.

13. The method of claim 1, wherein the presentation characteristic is determined based upon a network connection type of the mobile device.

14. The method of claim 1, wherein the presentation characteristic is determined based upon a determined security of the associated network that the mobile device is connected to.

15. A mobile device comprising:
   a processing unit for executing instructions; and
   a memory unit for storing instructions, which when executed by the processing unit configure the mobile device to perform a method according to claim 1.

16. The method of claim 1, wherein presenting each of the plurality of email messages is done on the mobile device and provides an indication of metadata classification information associated with the respective email messages.

17. The method of claim 1, wherein the presentation characteristic is determined based upon a location of the mobile device.

18. The method of claim 1, wherein the presentation characteristic is determined based upon a network that the mobile device is connected to.

19. The method of claim 1, wherein the presentation characteristic is determined based upon a network connection type of the mobile device.

20. The method of claim 1, wherein presenting each of the plurality of email messages in accordance with the determined presentation characteristic of each respective email further comprises one or more of:
   presenting the email with graphical information indicative of the extracted metadata;
   presenting the email with tactile feedback indicative of the extracted metadata; and
   presenting the email with auditory feedback indicative of the extracted metadata.

21. The method of claim 1, wherein the presentation characteristic is determined based upon a determined security of the associated network that the mobile device is connected to.

22. The method of claim 4, wherein the response to the security classification policy comprises an indication of the presentation characteristic.

23. The method of claim 4, wherein the response to the security classification policy comprises the security classification policy.

\* \* \* \* \*